United States Patent [19]

Lindblom et al.

[11] 4,280,317
[45] Jul. 28, 1981

[54] ADJUSTABLE COUPLING APPARATUS

[75] Inventors: Curtis H. Lindblom; Joe E. Shriver, both of New Holland, Pa.

[73] Assignee: Sperry Corporation, New Holland, Pa.

[21] Appl. No.: 140,898

[22] Filed: Apr. 16, 1980

[51] Int. Cl.³ .......................................... A01D 35/12
[52] U.S. Cl. ........................................ 56/15.6; 56/208
[58] Field of Search .................. 56/DIG. 1, 208, 15.8, 56/15.9, 15.6

[56] References Cited

U.S. PATENT DOCUMENTS

| 3,270,489 | 9/1966 | Rohweder | 56/15.6 |
|---|---|---|---|
| 3,358,865 | 12/1967 | Waldrop | 56/208 |
| 3,521,433 | 7/1970 | Wright et al. | 56/208 |
| 3,606,744 | 9/1971 | Eubanks | 56/14.4 |
| 3,638,407 | 2/1972 | Togami | 56/15.6 |
| 3,665,688 | 5/1972 | Sheehan et al. | 56/15.6 |
| 3,958,399 | 5/1976 | Schoeneberger | 56/208 |
| 4,085,571 | 4/1978 | Mortier et al. | 56/208 |
| 4,212,144 | 2/1980 | Raineri | 56/208 |

Primary Examiner—Paul J. Hirsch
Attorney, Agent, or Firm—James R. Bell; Frank A. Seemar; Larry W. Miller

[57] ABSTRACT

Coupling operations between a motorized vehicle and an attachment may be complicated when, due to uneven terrain, it becomes difficult to properly align a coupling component of the vehicle with a mating coupling component of the attachment. An adjustable coupling apparatus is provided which includes a coupling arm pivotally mounted on a support. An end of the arm includes a receptacle and an associated latch. The coupling arm is pivotable for varying the position of the receptacle.

2 Claims, 4 Drawing Figures

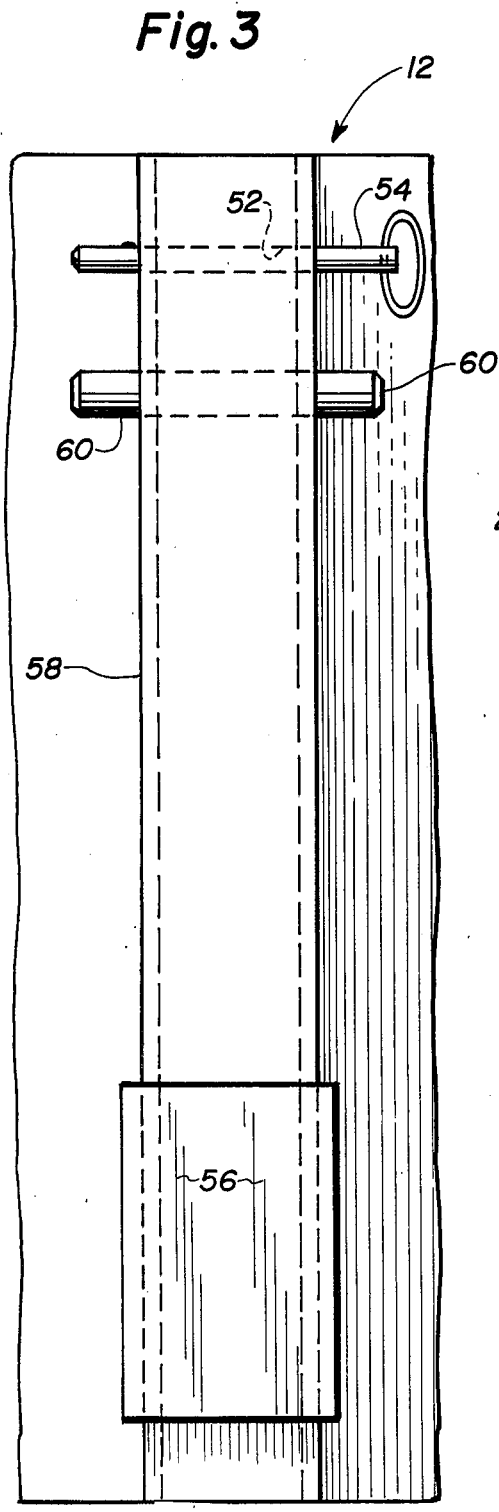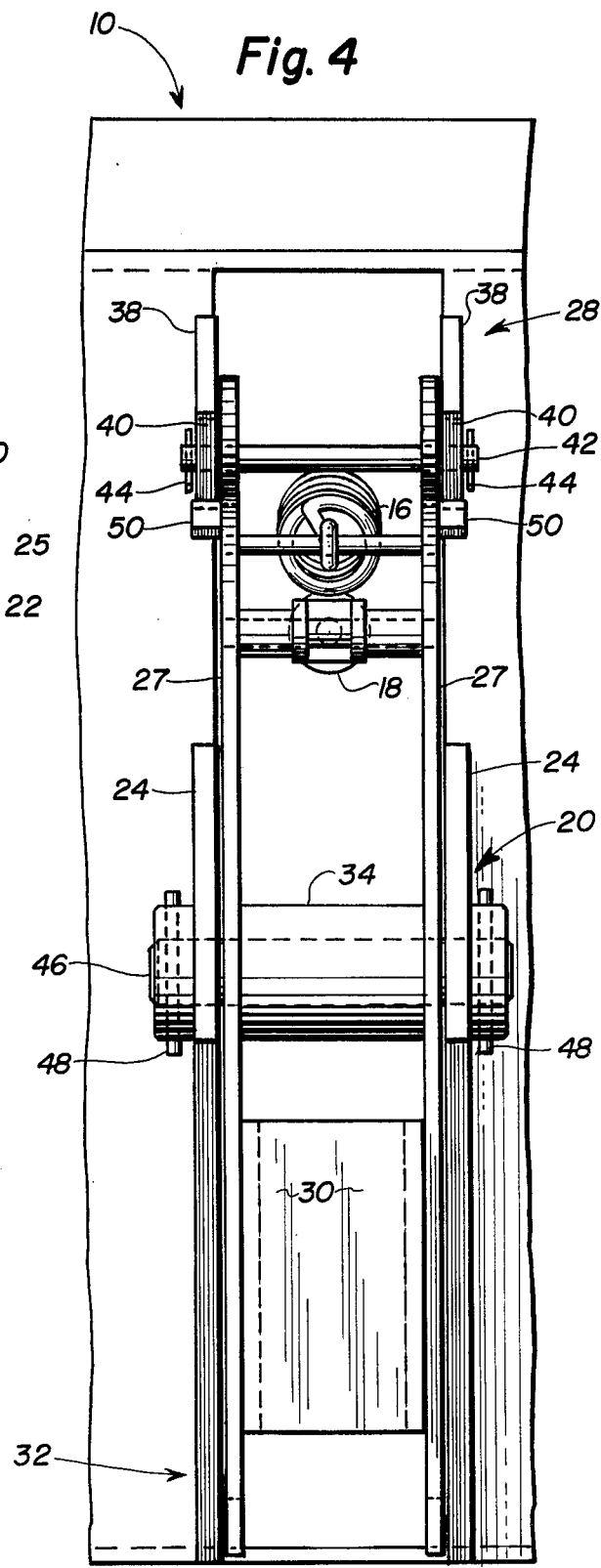

ADJUSTABLE COUPLING APPARATUS

BACKGROUND OF THE INVENTION

This invention relates generally to forage harvesters and, more particularly, to those including a motorized vehicle attached to a floating attachment.

During harvesting operations, a motorized vehicle portion of a harvester may be used with one of several harvesting attachments such as, for example, corn snapping, row crop, windrow pickup and direct cut attachments. It is, therefore, advantageous to be able to hitch or couple an attachment and vehicle as quickly and easily as possible. Such coupling is usually accomplished by means of cooperating coupling elements, one of which is connected to the vehicle and the other of which is connected to the attachment.

To perform a coupling operation, the coupling element on the vehicle portion is guided toward the coupling element on the attachment and when proper alignment is accomplished, the coupling elements are urged into engagement. Some coupling operations require manual assistance.

A limitation of such coupling operation arises due to the fact that although the vehicle may be guided toward the attachment to align the elements, coupling cannot be carried out successfully if the ground surface on which the respective vehicle and attachment rest is irregular so that one of the coupling elements is higher or lower than the other. To remedy this, the attachment must be raised or lowered such as by means of a jack or the like. In some heavy attachments, jack stands have been provided as part of the attachment. In order to operate the jack, the operator is inconvenienced by having to leave the vehicle.

Another limitation may occur during uncoupling. Again due to an irregular ground surface, the attachment and vehicle coupling components may be jammed into engagement in such a way that movable latches or pins of the coupling components cannot be separated for uncoupling until the attachment is moved relative to the vehicle to relieve such jamming.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing an adjustable coupling apparatus including a coupling arm mounted for pivoting on a support. An end of the arm includes a receptacle and a latch adjacent the receptacle. The latch is movable between latching and unlatching positions. The coupling arm is pivotable between positions wherein the receptacle moves relative to the pivot support.

The foregoing and other aspects will become apparent from the following detailed description of the invention when considered in conjunction with the accompanying drawings. It is to be expressly understood, however, that the drawings are not intended as a definition of the invention but for the purpose of illustration only.

BRIEF DESCRIPTION OF THE DRAWINGS

In the drawings:

FIG. 3 is an isolated partial frontal view illustrating an embodiment of the mating coupling element of an attachment as viewed from line III—III of FIG. 2; and FIG. 4 is an isolated partial frontal view illustrating an embodiment of the mating coupling element of a vehicle as viewed from line IV—IV of FIG. 2.

DESCRIPTION OF THE PREFERRED EMBODIMENT

Figure 1:
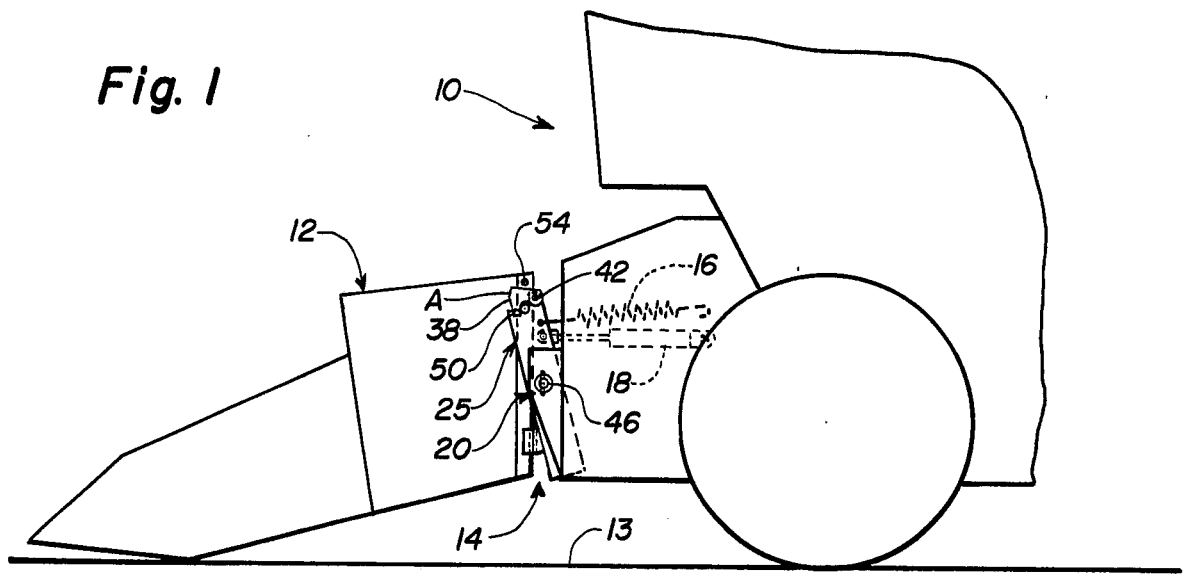
FIG. 1 is a partial side elevational view illustrating a vehicle connected to an attachment utilizing an embodiment of the adjustment coupling apparatus of this invention.

In FIG. 1, an exemplary motorized vehicle, such as a forage harvester, is generally designated 10 and is coupled to a removable attachment such as, for example, a corn snapping attachment designated 12. Vehicle 10 and attachment 12 are coupled by an adjustable coupling apparatus 14 which is controlled from an operator's station (not shown) on vehicle 10. Control is effected by means of a resilient device 16 and a hydraulic device 18 which cooperate in a well known manner, and which are adaptable to control pivotal movement of apparatus 14.

Figure 2:
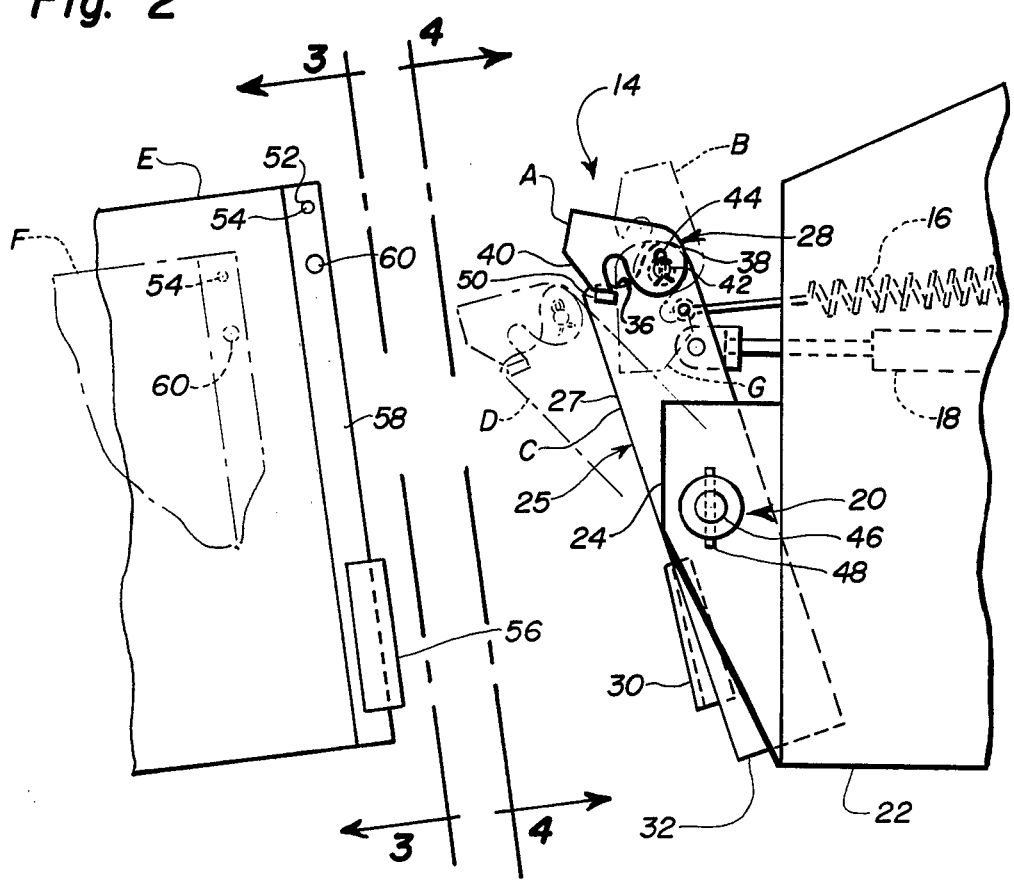
FIG. 2 is an isolated partial side elevational view illustrating an embodiment of mating coupling elements of this invention.

In FIGS. 2, 3 and 4, coupling apparatus 14 is mounted on a pivot support 20 which is ultimately connected to a frame portion 22 of vehicle 10. Support 20 includes a pair of spaced apart steel plates 24 welded to frame 22.

A coupling arm is generally designated 25 and is of a construction sufficient for pivotal movement when mounted between plates 24. Arm 25 comprises a pair of steel plates 27. A cylindrical steel pin 42 is welded to maintain plates 27 spaced apart at a first end 28. A protruding channel shaped steel member 30 is welded between plates 27 for maintaining the plates spaced apart at a second end 32 and also for functioning as a pad. Between pin 42 and channel member or pad 30 is an enlarged cylindrical steel spacer and housing 34 welded to maintain plates 27 spaced apart at approximately midpoint between ends 28,32.

First end 28 of arm 25 includes a recessed portion in plates 27 for defining a receptacle 36. A pair of latches 38 are each mounted to arm 25 adjacent receptacle 36. Latches 38 are pivotally movable between latching and unlatching positions (positions A and B respectively in FIG. 2). Movement from position A (solid line) to B (dotted line) is enhanced due to an inclined surface 40 formed on each latch 38. A steel pin 42 is inserted through and welded to plates 27. Latches 38 are maintained in place by cotter pins 44 for rendering latches 38 pivotal. Steel pin 46 is inserted through a bearing mounted and lubricated spacer housing 34 through arm plates 27 and through support plates 24 and maintained in place by bolts 48 for rendering arm 25 pivotal. A pair of steel stops 50 are welded on plates 27 adjacent receptacle 36 for functioning as a rest for latches 38 in position A.

Attachment 12 includes a protruding steel channel shaped spar 58 including a pair of transversely extending cylindrical steel nubs 60 which function as a means for engaging receptacle 36 and latches 38. Spar 58 and nubs 60 are of a construction sufficient to permit spar 58 to move between plates 27 so that nubs 60 can engage inclined surfaces 40 of latches 38 and urge the latches to pivot from position A to position B. Thereafter, nubs 60 engage receptacle 36 and the gravity prone latches 38 automatically pivot back to position A and engage stops 50.

A pin receptacle 52 is formed transversely through spar 58 for receiving a pin 54 after nubs 60 are latched in receptacle 36. This limits further movement of latches 38 which are maintained in position A between stops 50 and pin 54, see FIG. 1. A steel pad 56 is welded to attachment 12 at spar 58 for mating engagement with pad 30 of vehicle 10.

Resilient means 16, such as a high spring rate coil spring, is connected in tension between vehicle 10 and arm 25. Also, hydraulic means such as a piston 18 is connected between vehicle 10 and arm 25. Hydraulic means 18 is operably connected for pivoting arm 25 about pin 46 thus overriding the forces of spring 16 to pivot arm 25 between position C (solid line) and position D (dotted line). In this manner, the position of receptacle 36 is varied relative to pin 46 and relative to nubs 60 which can range, for example, between position E (solid line) and position F (dotted line). When hydraulic override is terminated, only forces exerted by spring 16 act to pivot arm 25 about pin 46 causing attachment 12 to float above ground surface 13. Such cooperative action of spring 16 and piston 18 is well known.

With the parts assembled as set forth above it can be seen that adjustable coupling apparatus 14 can be used advantageously for coupling operations generally and, more specifically, for coupling a motorized vehicle such as a forage harvester to one of many harvesting attachments.

When attachment 12 is to be coupled to vehicle 10, the receptacle 36 can be guided into alignment with nubs 60 by coordinating steering of the vehicle and pivoting of arm 25. When alignment is achieved, movement of vehicle 10 toward attachment 12 will cause nubs 60 to engage inclined surface 40 and urge latches 38 from position A to position B. When nubs 60 engage receptacles 36, the gravity prone latches 38 will return to position A engaging stops 50.

After this is accomplished, release of hydraulic pressure from cylinder 18 will enable spring 16 to act on arm 25 thus urging pad 30 into engagement with pad 56 thus causing attachment 12 to float in the well known manner. Pins 54 can then be manually inserted in pin receptacles 52.

For uncoupling, pins 54 can be removed when attachment 12 floats. Latches 38 can then be rotated beyond position B to a dotted line position G, FIG. 2. Piston 18 can then be used to overcome spring 16 and arm 25 can be rotated to permit attachment 12 to rest on ground 13 and disengage nubs 60 from receptacle 36. Vehicle 10 can then be urged away from attachment 12.

The foregoing has described an adjustable coupling attachment which permits a vehicle operator to remain at the operator's station during the portion of the coupling and uncoupling operations when the motorized vehicle is moving either toward or away from the attachment.

It is anticipated that aspects of the present invention, other than those specifically defined in the appended claims, can be obtained from the foregoing description and the drawings.

Having thus described the invention, what is claimed is:

1. In combination with a motorized harvesting vehicle and a removable harvesting attachment, an adjustable coupling apparatus comprising:
   (a) a support connected to a frame portion of the vehicle;
   (b) a coupling arm pivotally mounted on the support;
   (c) a first end of the arm defining a receptacle formed therein;
   (d) a latch connected to the first end of the arm adjacent the receptacle, the latch being movable between latching and unlatching positions relative to the receptacle and having an inclined surface;
   (e) means connected to the attachment for engaging the receptacle and the inclined surface portion of the latch;
   (f) means connected to the vehicle for moving the arm between pivotal positions for varying the position of the receptacle relative to the support and relative to the means for engaging the receptacle;
   (g) a first pad connected to the coupling arm, said pad being adjacent a second end of the arm opposite the first end; and
   (h) means connected to the attachment for engaging the first pad, said means including a second pad spaced from the means for engaging the receptacle.

2. The combination of claim 1 including:
   means for securing the latch in the latching position.

* * * * *